March 13, 1962 R. C. JAMISON, SR., ETAL 3,024,722
PRINTER FOR CANS
Filed Nov. 10, 1958 6 Sheets-Sheet 1
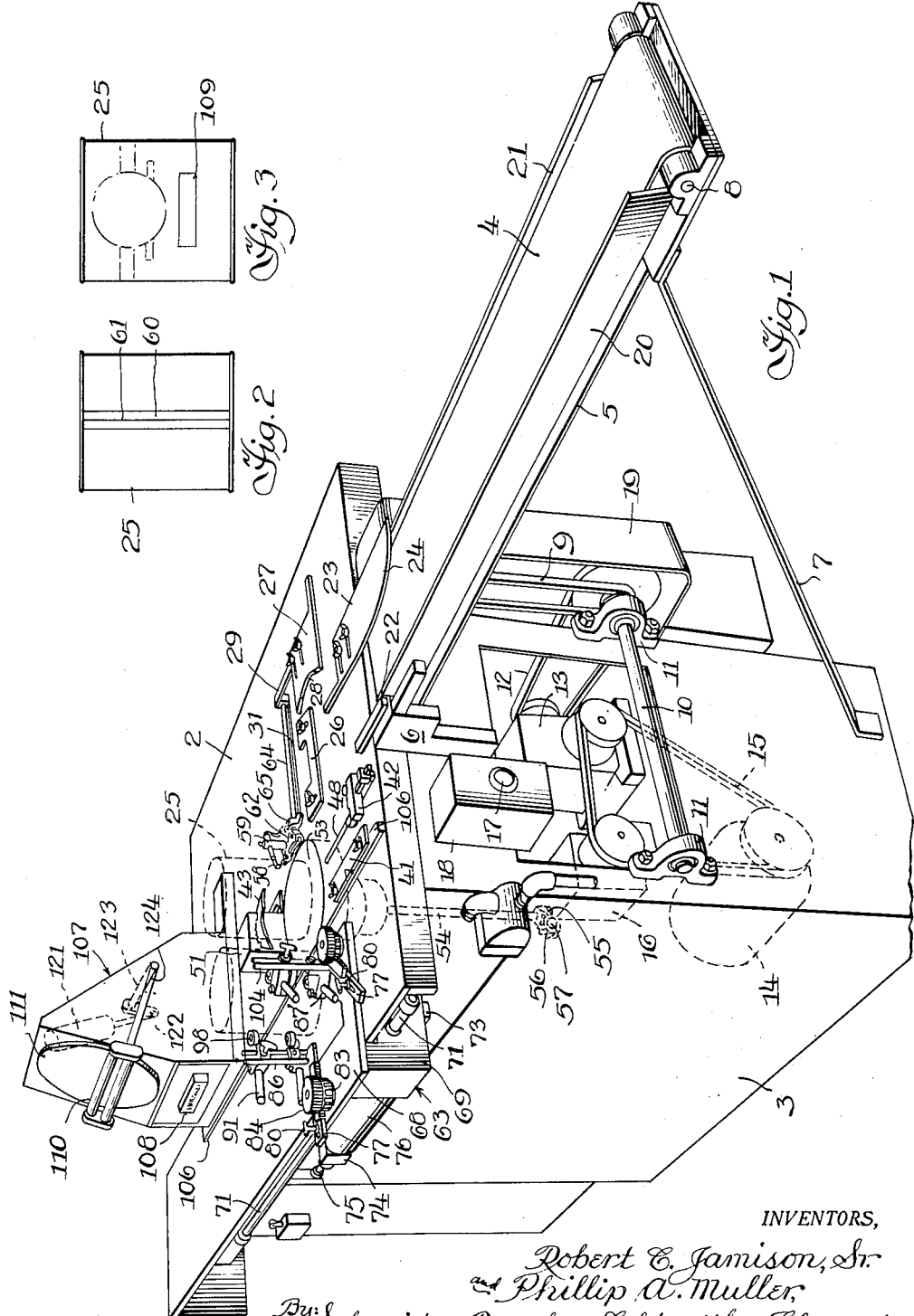
INVENTORS,
Robert C. Jamison, Sr.
and Phillip A. Muller,
By: Schneider, Dressler, Goldsmith & Clement,
Attys.

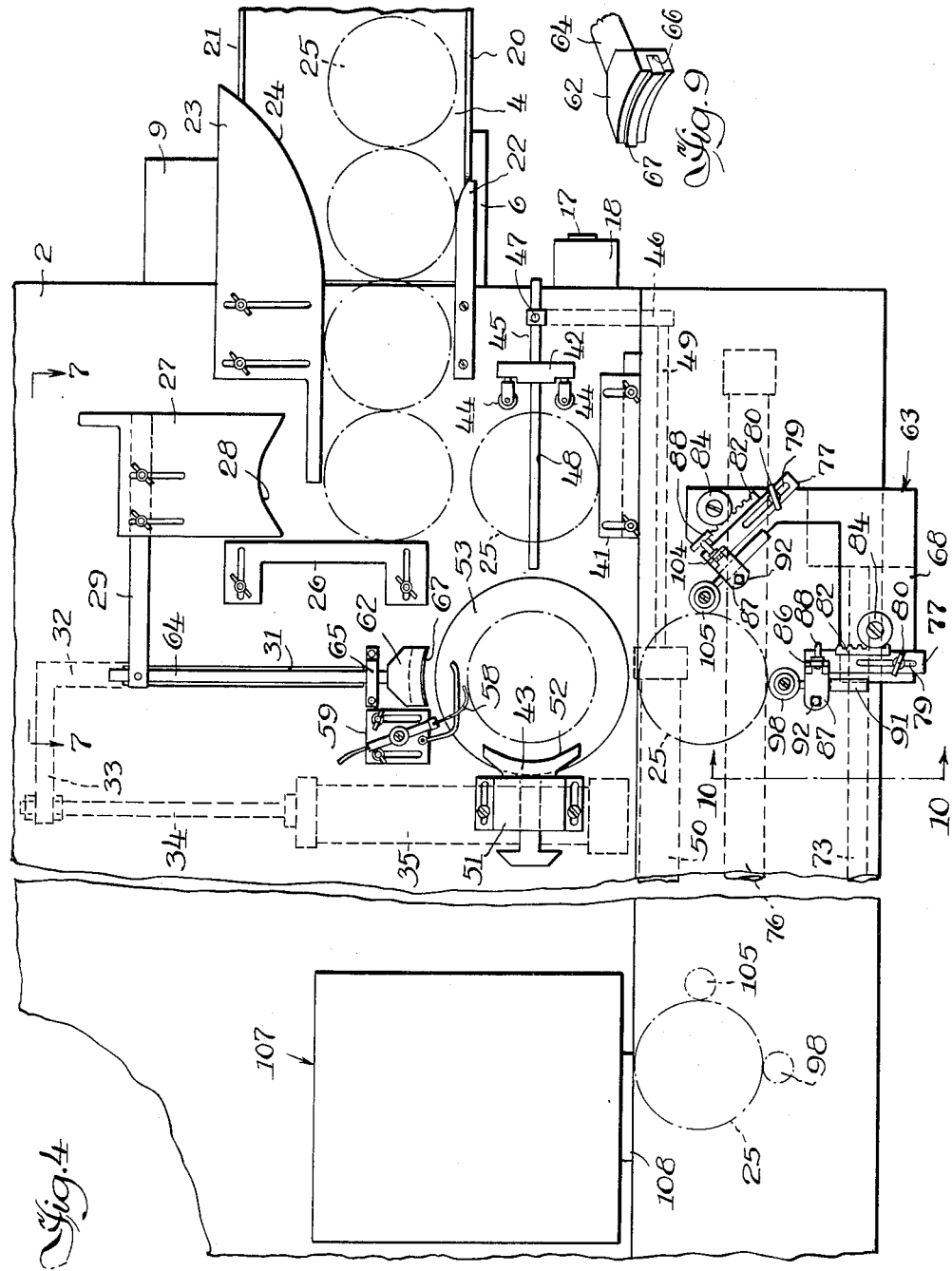

March 13, 1962 R. C. JAMISON, SR., ETAL 3,024,722
PRINTER FOR CANS
Filed Nov. 10, 1958 6 Sheets-Sheet 3
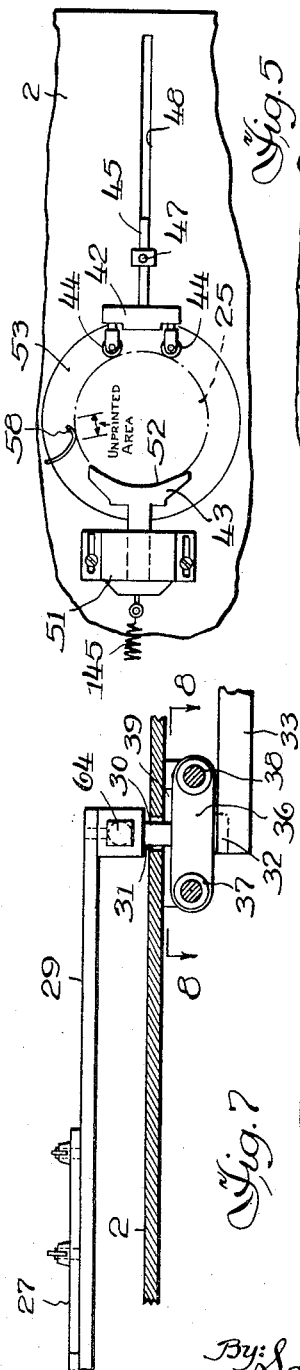
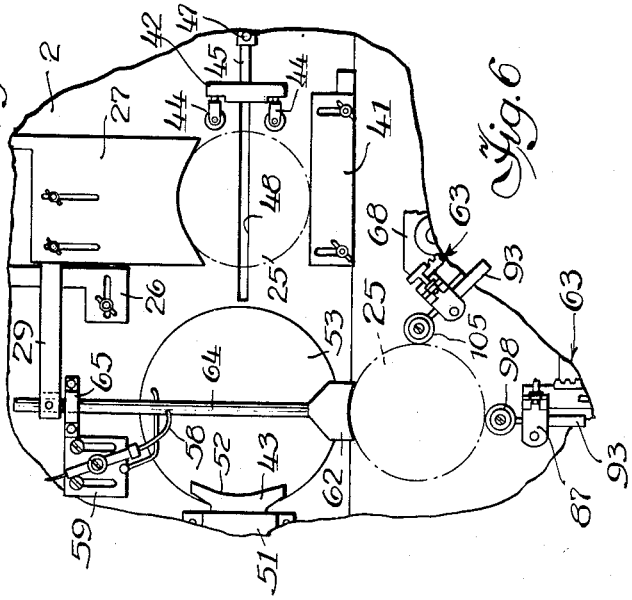
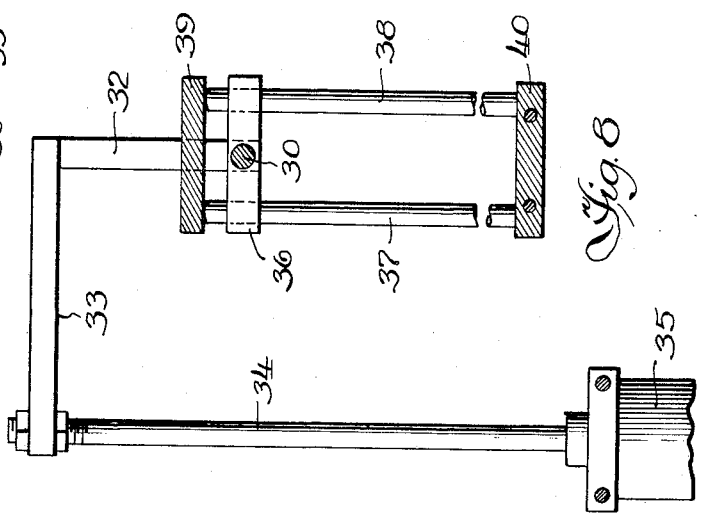
INVENTORS.
Robert C. Jamison, Sr.
and Phillip A. Muller,
By: Schneider, Dressler, Goldsmith & Clement,
Attys.

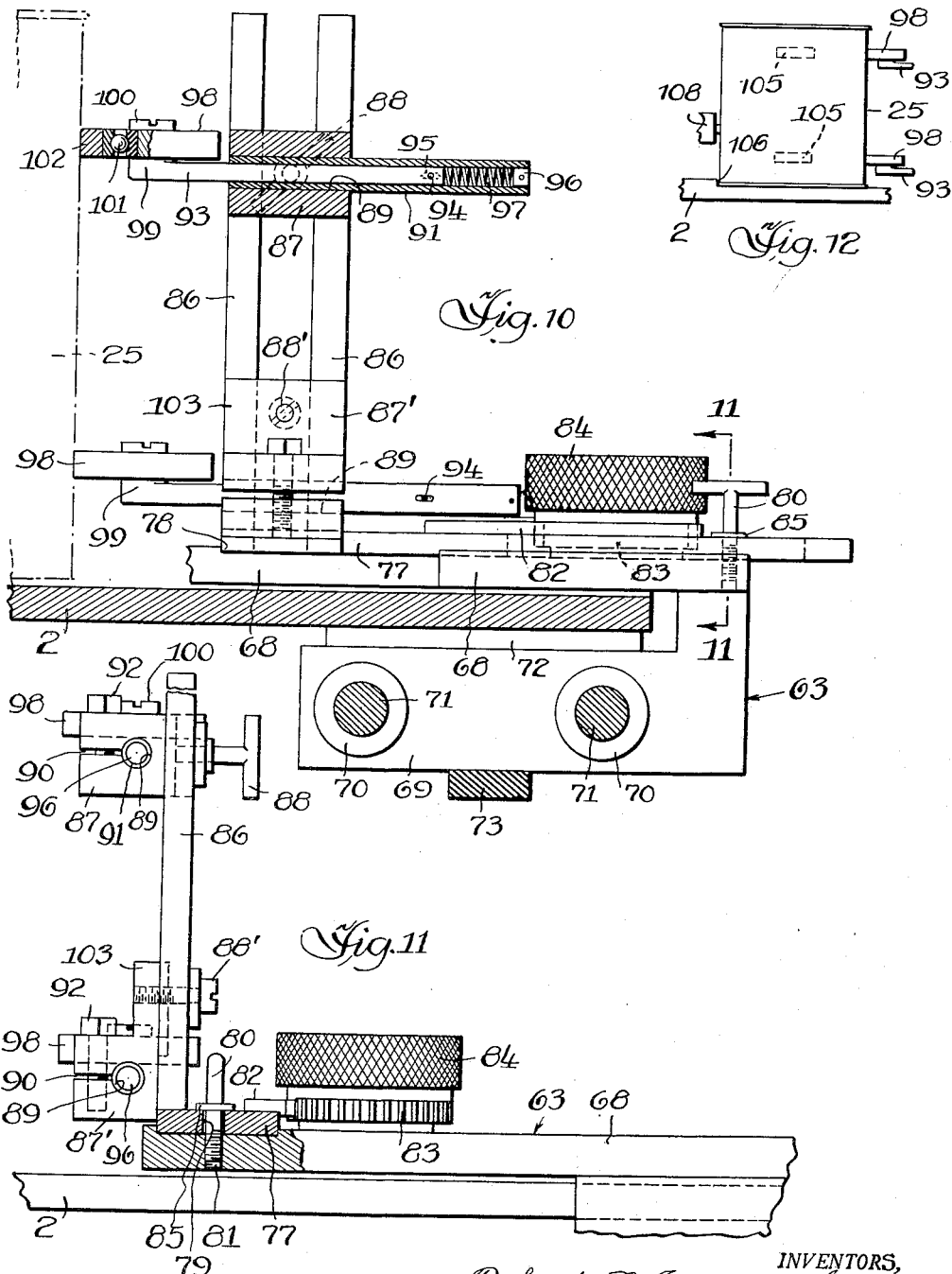

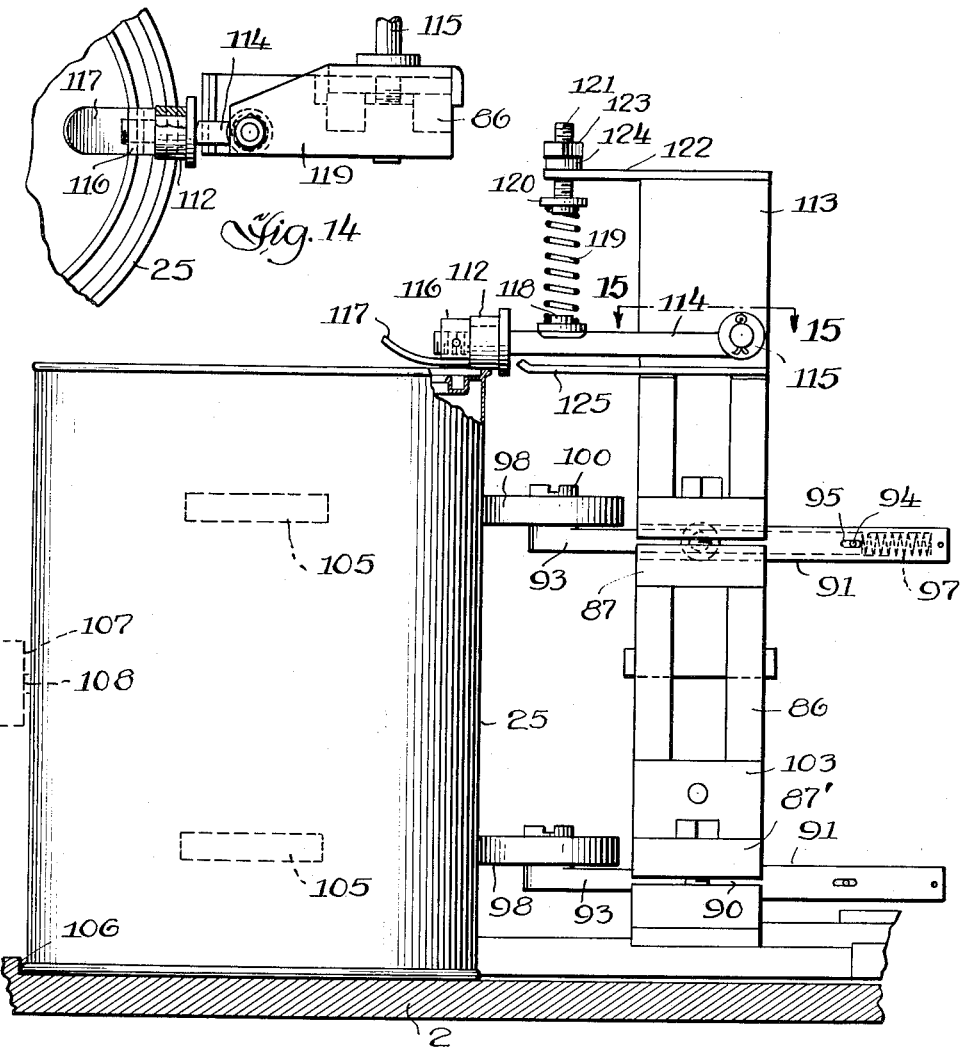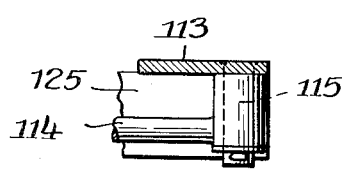

March 13, 1962  R. C. JAMISON, SR., ETAL  3,024,722
PRINTER FOR CANS
Filed Nov. 10, 1958  6 Sheets-Sheet 6

INVENTORS,
Robert C. Jamison, Sr.
and Phillip A. Muller,
By: Schneider, Dressler, Goldsmith & Clement,
Attys.

United States Patent Office 3,024,722
Patented Mar. 13, 1962

3,024,722
PRINTER FOR CANS
Robert C. Jamison, Sr., Jackson, and Phillip A. Muller, Detroit, Mich., assignors to American-Marietta Company, a corporation of Illinois
Filed Nov. 10, 1958, Ser. No. 773,025
3 Claims. (Cl. 101—40)

This invention relates to a printer for cans, and is particularly concerned with means for automatically positioning a series of cans in position for a printing operation in timed sequence.

The invention is particularly advantageous in connection with cans that are lithographed in considerable quantities and thereafter printed to identify the specific contents contained in the can. In the paint industry it is common practice for paint cans to be lithographed with an all-over design in large quantities to reduce the cost, and printed to identify the particular color in each can after the cans have been filled with paint, or after the cans to be filled with paint of a specific color are separated from the larger quantity of lithographed cans. It is important to have the name of the color appear in the same relative position on each can.

Methods heretofore used to print the name of the color on the can have always required considerable handling, with consequent waste of labor. The machine of the present invention prints the necessary data on the lithographed cans with a minimum of manual handling or other operations.

After the machine embodying the invention is set up, the only personal attention required is to position the cans in upright position on a conveyor belt. The belt moves each can against a transverse stop member on a table. A transverse pusher, actuated by a starting switch, moves each can transversely of the table into longitudinal alignment with a rotatable magnetic disk preferably flush with the top surface of the table. An indexing fork is then moved longitudinally of the table to move the can onto the disk, and the disk is then rotated until the can label faces a predetermined direction. A second transverse pusher, rigidly secured to the first pusher, engages the can successively to push each of them in front of a feed unit, in regular sequence, without rotating the can. The feed unit then pushes the can past a type block by means of which the color data, or any other desired data, is automatically printed in a selected area on the peripheral surface of the can.

These various operations are so synchronized that a stream of cans is constantly moving through the machine. As one can is being moved transversely of the table into longitudinal alignment with the index fork, a second can is being moved in the same direction, from the rotatable magnetic disk into alignment with the feed unit. The longitudinal movement of two cans is also simultaneous in different parts of the machine. The longitudinal movements of the index fork and the feed unit are timed to position the cans for each operation, without interfering with the movement of either transverse pusher.

The structure by means of which the above noted and other advantages of the invention are attained will be described in the following specification, taken in conjunction with the accompanying drawings, showing two preferred illustrative embodiments of the invention, in which:

FIGURE 1 is a perspective view of a machine embodying the invention;

FIG. 2 is an elevational view of a can of the type handled by the machine, showing the seam area of the can, which area is not covered by lithography;

FIG. 3 is an elevational view of the can shown in FIG. 2, showing the area of the peripheral surface of the can in which the color identification is printed by the machine of FIG. 1;

FIG. 4 is a fragmentary top plan view of the machine of FIG. 1;

FIG. 5 is a fragmentary top plan view of the machine, showing a can centered on the rotatable magnetic disk;

FIG. 6 is a fragmentary top plan view of the machine, showing the transverse pushers for simultaneously pushing two cans transversely of the machine from the initial can position on the table into longitudinal alignment with the index fork and the rotatable magnetic disk, and from the disk into alignment with the feed unit;

FIG. 7 is a fragmentary cross sectional view, taken along the line 7—7 of FIG. 4;

FIG. 8 is a plan sectional view, taken along the line 8—8 of FIG. 7;

FIG. 9 is a fragmentary detail perspective view of the pushing end of the transverse pusher for pushing the can from the rotatable disk into alignment with the feed unit;

FIG. 10 is a fragmentary cross sectional view, taken along the line 10—10 of FIG. 4;

FIG. 11 is a fragmentary cross sectional view, taken along the line 11—11 of FIG. 10;

FIG. 12 is a diagrammatic view showing the arrangement of rollers on the feed unit for pushing the can into position adjacent the printing unit;

FIG. 13 is a view, similar to FIG. 10, showing a modified rolling guide;

FIG. 14 is a fragmentary top plan view, showing the top roller of the rolling guide of FIG. 13;

FIG. 15 is a fragmentary cross sectional view, taken along the line 15—15 of FIG. 13;

Figure 16:
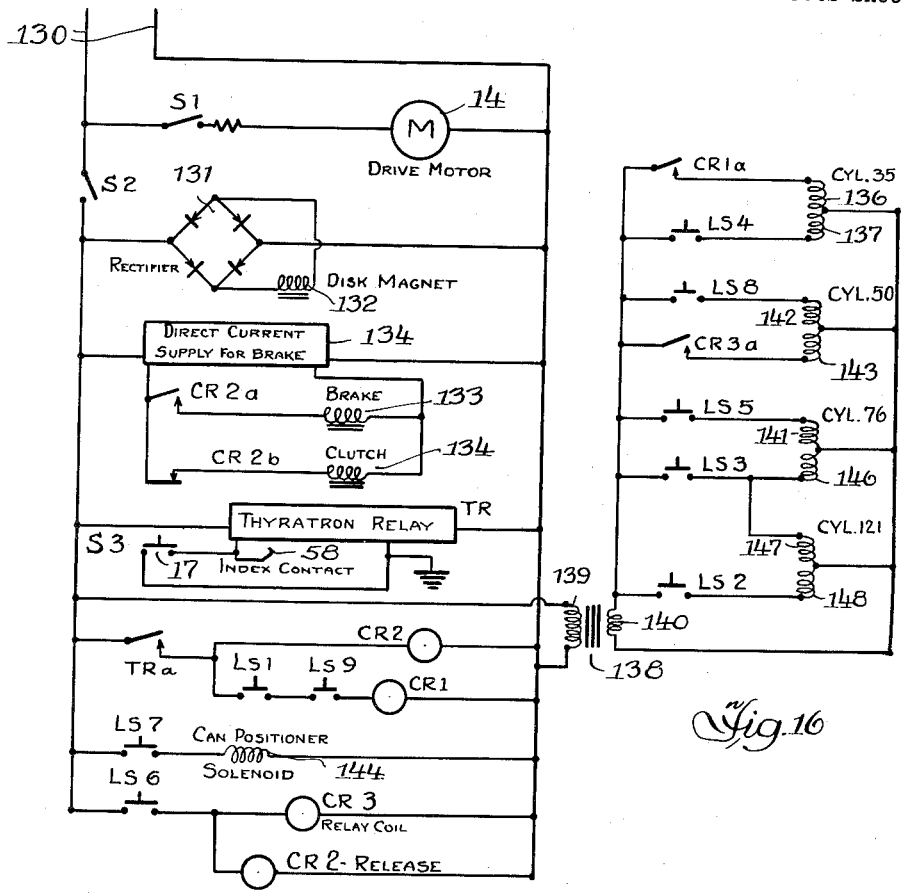
FIG. 16 is a wiring diagram of the operating circuit of the machine.

Referring to FIG. 1 of the drawings, the reference numeral 2 indicates a flat table mounted on any suitable base 3 which also supports various parts of the machine. An endless conveyor belt 4 is rotatably mounted in a frame 5 supported by brackets 6, secured to the front end of table 2, and a brace 7 extending from the outer end of frame 5 to the lower portion of base 3. Belt 4 is trained over a pair of parallel shafts 8, one of which is driven by a belt 9 rotated by a driven shaft 10. Shaft 10 is journalled in brackets 11 mounted on base 3, and is driven by a belt 12, connected by suitable gearing in a gear box 13, to a motor 14 through another belt 15. Belt 15 also drives reduction gearing in a gear box 16. Motor 14 is actuated by a switch 17 housed within a switch box 18. Motor 14, gear boxes 13 and 16, and switch box 11 are all mounted in any suitable manner on base 3 below table 2. A guard 19 for belt 9 is also mounted on base 3.

The upper reach of conveyor belt 4 is flush with the upper surface of table 2, and cans manually placed on the belt in upright position are successively moved onto the front end of the table. Frame 5 is provided with upstanding side rails 20 and 21 to keep the cans on the conveyor belt. A guide strip 22, mounted on table 2, is aligned with side rail 20, and extends over one edge of the conveyor belt. A guide plate 23, adjustably mounted on table 2, extends over the opposite edge of belt 4 and is curved in its horizontal plane, as indicated at 24, to align cans 25 in single file as they are pushed onto table 2 by other cans disposed rearwardly thereof on belt 4. A stop member 26, adjustably mounted on table 2, extends transversely between the longitudinal planes at the inner edges of guide strip 22 and guide plate 23. When the foremost can engages stop member 26 it is transversely aligned with a transverse pusher 27. Guide plate 23, stop member 26 and pusher 27 are adjustable to fit cans of different sizes.

Pusher 27 is curved concavely on its forward edge, as indicated at 28, FIG. 4, to engage the side of upright can 25 stopped against stop member 26. Pusher 27 is mounted on a longitudinally extending bar 29, secured at an end thereof to a vertical rod 30 (FIG. 7) which extends through a slot 31 in table 2. As shown in FIGS. 7 and 8, rod 30 is connected by a pair of bars 32 and 33 to the end of a piston rod 34 extending from a piston reciprocably mounted in an air cylinder 35. Rod 30 and bar 32 are connected to a guide plate 36 slidably mounted on a pair of guide rods 37 and 38, rigidly mounted in a pair of spaced parallel brackets 39 and 40 secured to the underside of table 2.

As piston rod 34 is moved inwardly of cylinder 35, pusher 27 moves a can 25 transversely from its position adjacent stop member 26 into engagement with another stop member 41 adjustably mounted on table 2 and extending longitudinally thereof. An upright can 25 positioned against stop member 41 is in longitudinal alignment with an indexing fork 42 and a can positioner 43 on opposite sides of the can. Indexing fork 42 is provided with a forwardly extending pair of freely rotating rollers 44 (FIGS. 5 and 6) adapted to engage one side of an upright can 25 positioned against stop member 41. Fork 42 is mounted on a rod 45 connected to a transverse bar 46 under table 2 by a vertical rod 47 which extends through a slot 48 in the table. Bar 46 is secured to one end of a piston rod 49 extending from an air cylinder 50.

Can positioner 43 is slidably mounted in a bracket 51 adjustably mounted on table 2. Can positioner 43 has a concave surface 52 facing rollers 44, and is controlled by fork 42. As fork 42 moves forwardly, can positioner 43 moves rearwardly and cooperates with fork 42 to center an upright can 25 on a rotatable magnetic disk 53, as hereinafter described.

Disk 53 is mounted on a vertical shaft 54 (FIG. 1) which extends downwardly to gear box 16, and has a gear 55 meshed with a gear 56 mounted on a shaft 57 projecting from gear box 16. The driving mechanism for shaft 54 includes a clutch and brake (not shown) operated by an electrical circuit hereinafter described. After upright can 25 is centered on disk 53, the indexing fork and can positioner are retracted, and rotation of the disk is started. The disk is magnetized to prevent accidental displacement of the upright can relative to the disk.

An index finger 58, adjustably mounted on an insulating bracket 59, engages the peripheral surface of the upright can 25 on disk 53. As shown in FIG. 2, the peripheral surface of can 25 is lithographed except along a narrow strip 60 adjacent the seam 61. When the rotation of the upright can on the disk 53 brings strip 60 into contact with the index finger, rotation of the disk is stopped by automatic release of the clutch and application of the brake to shaft 54. The use of strip 60 as a reference point to stop the rotation of disk 53 causes uniform rotational positioning of each upright can 25, relative to table 2. This uniform rotational positioning of cans 25 is important in connection with the subsequent printing operation.

After a can 25 has been rotated to the desired position, it is moved transversely from disk 53 into longitudinal alignment with a feed unit 63 by a pusher 62. The feed unit is movable longitudinally relative to table 2. Pusher 62 is mounted on one end of a rod 64, secured to bar 29, and extending through an aperture in a bracket 65 mounted on table 2. Pusher 62 is moved by the reciprocation of piston rod 34 simultaneously with pusher 27, which is also connected to bar 29. The front face of pusher 62, which is concave to engage the peripheral surface of upright can 25, is provided with a groove or recess 66, as shown in FIG. 9, in which an insert 67 of soft rubber or some similar material is placed. The insert projects beyond the concave surface of the pusher so that the peripheral surface of the can is engaged by the insert, rather than by the surface of the pusher. The rubber surface contact between insert 67 and can 25 prevents scratching the can, and also prevents rotation thereof as the can is pushed from disk 53 into longitudinal alignment with feed unit 63.

Feed unit 63 comprises a plate 68 of substantially L-shape extending beyond one longitudinal edge of table 2. A block 69 secured to plate 68 extends under table 2 and is provided with apertures receiving bearings 70 (FIG. 10) which permit the block to be slidably mounted on a pair of guide rods 71. Rods 71 are supported by brackets 72 secured to the underside of table 2. A bar 73, secured at one end to block 69, is secured at its other end to a collar 74 (FIG. 1) mounted on a piston rod 75 projecting from an air cylinder 76. Reciprocation of piston rod 75 moves plate 68 back and forth along one edge of table 2.

Two plates 77 are each slidably mounted in a recess 78 provided therefor in the top surface of plate 68. Each plate 77 is provided with a longitudinal slot 79, and a screw 80 extends through said slot and is threaded into an aperture 81 (FIG. 11) to secure each plate 77 in any desired position relative to plate 68. A rack 82, mounted on one edge of plate 77, is engaged by a pinion 83 to move plate 77 longitudinally in either direction. Pinion 83 is rotated by a knurled knob 84 integral with pinion 83, or mounted on the same shaft and rigidly interconnected to said pinion. After plate 77 has been moved to its desired position by manual rotation of knob 84, screw 80 is tightened until a collar 85 (FIGS. 10 and 11), which is rigidly secured to screw 80, presses against plate 77 to hold it tightly against plate 68 to prevent relative movement between plates 68 and 77.

A pair of posts 86, extending upwardly from plate 68 in spaced parallel relationship, support an upper bracket 87 and a lower bracket 87' secured thereto by a thumb screw 88 and screw 88' respectively. Brackets 87 and 87' are each provided with a transverse bore 89 (FIG. 10) spaced from posts 86. A slot 90 (FIG. 11), extending inwardly from one side of each bracket 87 and 87', communicates with bore 89 to permit a clamping action against a sleeve 91 positioned in the bore. A screw 92, threaded into a recess, traverses slot 90 and is tightened to clamp sleeve 91 in place.

A rod 93 extends into one end of sleeve 91 and is slidable in said sleeve. A pin 94 extending through a longitudinal slot 95 in rod 93 and rigidly secured to sleeve 91, limits the sliding movement of the rod. A plug 96 is secured in the other end of sleeve 91 to close it. A compression spring 97, mounted in sleeve 91 between the inner end of rod 93 and plug 96, urges the rod outwardly.

A roller 98 is rotatably secured by screw 100 on a short shaft 99 extending upwardly from one end of rod 93. The roller preferably contains ball bearings 101 to make it rotate freely. Roller 98 is provided with a rim 102 of soft rubber on its periphery and is adapted to be engaged by the peripheral surface of an upright can 25, moved from disk 53 by pusher 62 which is aligned transversely with the roller. Preferably bracket 87 is clamped to posts 86 at such a height as to make roller 98 engage can 25 adjacent the top of said can. Spring 97 presses roller 98 firmly into contact with can 25.

A second roller 98 engages can 25 adjacent the bottom of the can. The mounting of the second roller is the same as that previously described, except that an ordinary screw 88' is used with bracket 87' because of the space limitations adjacent the lower portion of posts 86. Bracket 87' differs from bracket 87 only in that a flange 103 extends upwardly from bracket 87' to receive screw 88' because of said space limitaitons.

Two posts 104, similar to and disposed at an angle to posts 86, are vertically mounted on plate 68 at one end of the second plate 77. Rollers 105 are mounted in substantially the same manner as rollers 98, except that springs 97 are omitted and rollers 105 are not spring pressed. The vertical line between the points of engagement of rollers 105 with the peripheral surface of the upright can is spaced 90° around the circumference of the can from the vertical line between the points of engagement of rollers 98 with the can.

As shown in FIG. 1, a guide rail 106 extends longitudinally of table 2. Spring pressed rollers 98 push cans 25 into engagement with said guide rail 106. Accordingly, as feed unit 63 is moved longitudinally toward a printing unit 107 adjacent the rear end of table 2, the soft rubber surfaces of rollers 98 force the can circumferentially against the guide rail with sufficient friction to make the can rotate. The spring pressure of rollers 98, forcing upright can 25 against guide rail 106, controls the rotation of the can to prevent any slippage. As the upright can rotates past a type block 108 which projects from printing unit 107, the portion 109 (FIG. 3) of the peripheral surface of the can, designed to receive the printing impression, rolls past said type block in accurate registration therewith, to insure proper positioning of the data printed on the can.

Inking rollers 110, in engagement with an inking plate 111, are controlled by an air cylinder 121 connected thereto by a bell-crank 122 rigidly secured to a shaft 123 to which arms 124 are fixed. The movement of the inking rollers is synchronized so that they are at substantially the upper end of their stroke as can 25 is moved past type block 108. After one can has been moved past type block 108 to receive the printed impression, rollers 110 move across inking plate 111 to pick up ink, and continue their downward movement to apply the ink to type block 108. Rollers 110 then move upwardly out of the way of the next can as it is moved past the type block.

The embodiment illustrated in FIGS. 13–15 is essentially the same as that previously described except that a top roller 112 is provided to hold upright can 25 down against table 2. The rest of the structure is identical, and the description will not be repeated. An upright extension 113 projecting from posts 86 has an arm 114 pivotally mounted thereon, as shown at 115. Roller 112 is rotatably held on the outer end of arm 114 by a nut 116. A curved tongue 117 extends outwardly from nut 116 to facilitate vertical positioning of can 25. A stud 118 is pressed downwardly against arm 114 by a spring 119 to hold top roller 112 in engagement with the top of the can being moved toward the printing unit. The upper end of spring 119 bears against a collar 120 carried by a threaded stud 121 extending through an aperture in an arm 122 and held in place by nuts 123 and 124 which may be adjusted to regulate the pressure of spring 119. Arm 122 extends laterally from the top of extension 113. A bar 125 extends outwardly from the bottom of extension 113 to provide a stop adapted to prevent arm 114 from swinging downwardly too far.

Figure 17:
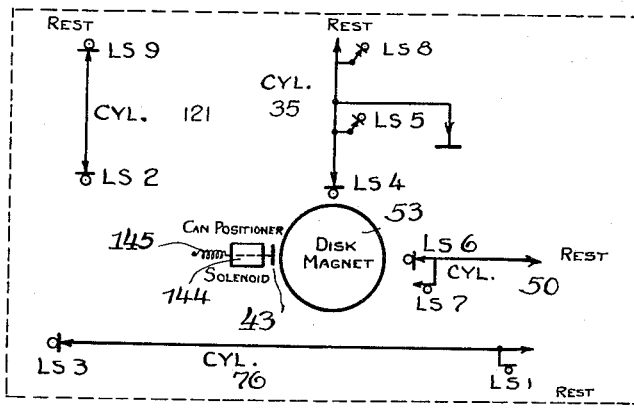
FIG. 17 is a diagram of the limit switch arrangement for the machine.

The electrical control system for automatically operating various parts of the above described mechanism in properly timed sequence, is shown schematically in FIG. 16. FIG. 17 is a diagrammatic illustration showing the relative positions of the limit switches with respect to the four piston-cylinder assemblies which operate the limit switches for control of the electrical system of FIG. 16.

The system shown in FIG. 16 is operative to sequentially control the four piston-cylinder assemblies so that they operate to properly position and transport the cans without interference between cans and with the proper safety relays which operate to prevent operation of one part of a mechanism when another part of a mechanism is unprepared for the first part to operate.

In the system shown in FIGS. 16 and 17, the limit switches have been designated by numerals preceded by the letters "LS," the control relays have been designated by numerals preceded by the letters "CR," and the control relay contacts have been indicated by "a" designations of the same reference characters as the control relays which operate them.

At the commencement of operation of the machine and the electrical control system, the switches S1 for the drive motor and S2 for the power supply to the control system are closed. This supplies power from a supply line 130, which is connected to a 120 volt, 60 cycle power source, to the motor 14 and the control system constituting the remainder of FIG. 16. When the motor 14 is energized it drives the conveyor 4 and the magnetic disk 53. Closing the switch S2 supplies power to the 4-way rectifier bridge 131 for energizing the electromagnet 132 for the magnetic disk to hold cans in place thereon.

At the start of operation all four of the cylinders 35, 50, 76 and 121 are at their rest positions. To start the operation, if there is no can present on the magnetic disk, the start switch 17 (S3) is closed. This shorts the index finger 58 to ground and causes the thyratron relay TR to fire, thereby closing the relay contacts TRa. This produces the same effect as though a can present on the magnetic disk 53 had been rotated to a point where the index finger 58 contacts the unpainted seam area of a can.

Closing the contacts TRa causes energization of the control relay CR2 which is connected directly in series with the contact TRa. It also causes energization of the control relay CR1 which is in series with limit switches LS1 and LS9, which series arrangement is in parallel with control relay CR2. Limit switches LS1 and LS9, at the commencement of operation are closed due to cylinders 76 and 121 being in their best positions.

Energization of control relay CR2 causes the brake contacts CR2a to close and the clutch contacts CR2b to open thereby actuating the brake to lock the magnetic disk 53 in its position with the can in proper position for transfer to the printing unit, and disconnects the clutch between the magnetic disk and the drive therefor. The brake is controlled by a brake solenoid 133 which is connected in series with the contacts CR2a and to a rectifier connected across the lines 130 for supplying direct current to the brake. The clutch is controlled by the clutch solenoid 134 which is connected in series with normally closed contacts CR2b and to the direct current supply rectifier 135 for supplying power to the brake and the clutch.

The energization of control relay CR1 closes contacts CR1a which permits energization of solenoid 136 to open the valve for cylinder 35 to drive the pushers 62 and 27 to move cans to the fork, and from the disk 53 to the feed unit 63. The contacts CR1a remain closed due to the long-time operation of the thyratron relay TR until cylinder 35 has moved to its fully retracted position at which time it closes limit switch LS4 causing energization of the solenoid 137 to close the valve for operating cylinder 35 and to cause the cylinder to move back to its position of rest automatically.

The electrical power supply for the valve solenoids 136 and 137 as well as for the valve solenoids for the other three piston-cylinder assemblies is supplied by a transformer 138 having its primary 139 connected across the lines 130 and having its secondary 140 connected across the parallel connected, series arrangements of valve solenoids, limit switches and control relay contacts.

When the piston-cylinder assembly 35 returns to its starting position, it recloses the limit switches LS5 and LS8 which control the operation of valve solenoid 141 for feed unit cylinder 76 and for controlling energization of the solenoid for fork cylinder 50, respectively. Closure of the limit switch LS8 energizes the valve solenoid 142 for fork cylinder 50 causing the fork to move and place a can on the magnetic disk 53. At the same time, closure of limit switch LS5 causes air valve solenoid 141 to open permitting the feed unit cylinder 76 to drive the unit longitudinally to the printing unit.

When the fork cylinder 50 reaches the limit of its movement, it closes limit switches LS6 and LS7. Closure of limit switch LS6 causes energization of control relay CR3 thereby closing relay contacts CR3a and energizing valve solenoid 143 which closes the valve for fork cylinder 50 thereby causing it to return to its rest position leaving the can on the magnetic disk.

Closure of limit switch LS6 also energizes control relay CR2-Release. This causes the contacts CR2a and CR2b to return to their normal positions de-energizing the brake solenoid 133 and energizing the clutch solenoid 134 to start the magnetic disk rotating.

Also, when limit switch LS7 is closed it energizes can positioning solenoid 144 which moves the can positioner 52 against the can on the disk to properly position the can concentrically on the disk. Return of fork cylinder 50 to its rest position and thereby releasing limit switch LS7 de-energizes the position of solenoid 144 and permits a spring 145 to return the can positioner 43 to its normal retracted position.

When the feed unit cylinder 76 reaches the maximum extent of its movement, it closes limit switch LS3 which energizes valve solenoid 146 to close the valve controlling feed unit cylinder 76 causing the cylinder 76 to return to its normal rest position.

Closure of limit switch LS3 also energizes valve solenoid 147 which operates the valve for supplying air to inking cylinder 121 to cause the inking rolls 110 to move across the plate 111 and the type block 108 to reink the type in the type block 108.

When the inking cylinder 121 moves away from its position of rest, it opens limit switch LS9 and thereby opens the circuit to control relay CR1 so that the pusher cylinder 35 cannot be actuated to cause the next cycle of operation to commence while the inking rolls 110 are at any position other than their rest position, thereby restraining the mechanism against possible jamming by driving a can into the inking rolls. When inking cylinder 121 reaches the limit of its movement, it closes limit switch LS2 which then energizes solenoid 148, closing the valve to the inking cylinder 121 and causing the cylinder to return to its normal position of rest.

When the inking cylinder 121 returns to its normal position closing the limit switch LS9, if the disk has rotated to a position where the unpainted seam area of the can is contacting and thereby grounding the index finger 58, the system will repeat the above described cycle of operation. If the disk has not rotated sufficiently far to cause grounding contact of the index finger 58 on the unpainted seam area of the can, it will continue to rotate until such ground contact is made. At that time, the grounding contact will cause firing of the thyratron relay TR and cause the relay contacts TRa to close, permitting the mechanism to go through the above described cycle of operation automatically.

While we have described two preferred embodiments of our invention in considerable detail, it will be understood that the description thereof is intended to be illustrative, rather than restrictive, as many details may be modified or changed without departing from the spirit or scope of the invention. Accordingly, we do not desire to be restricted to the exact construction described.

We claim:

1. A can printing machine comprising a table for supporting a plurality of cans in upright position, a printing unit mounted on said table, a guide rail mounted on said table in longitudinal alignment with said printing unit and extending across the front of said printing unit, a feed unit mounted on said table, means for moving a plurality of upright cans successively into predetermined rotational relationship to said printing unit in an area of said table spaced from said printing unit, an air cylinder for reciprocating said feed unit longitudinally of said table, said feed unit being adapted to cooperate with said guide rail when said feed unit is moved longitudinally of said table toward said printing unit to successively move individual upright cans from said area into rotational surface engagement with said printing unit, whereby an identical area of the peripheral surface of each can receives a printed impression from said printing unit, and means to prevent said first mentioned means from moving a can to said point until said feed unit has been moved forwardly of said area and is therefore in position to engage a can in said area.

2. A can printing machine comprising a table, a conveyor for successively moving upright cans onto said table, a transverse pusher, an indexing fork, a rotatable disk, said pusher and indexing fork being operable to successively move each of said cans in upright position along said table and onto said disk, means cooperating with said disk to successively position each of said cans in uniform, predetermined rotational position, a second transverse pusher, a printing unit, and a feed unit, said second transverse pusher being operable to successively move each of said cans from said disk into longitudinal alignment with said feed unit, a guide rail mounted on said table, said guide rail extending from the proximity of said disk across the front of said printing unit, and said feed unit being operable to successively move each of said cans from said last specified position, said feed unit being adapted to cooperate with said guide rail to position said cans into predetermined surface engagement with said printing unit.

3. A can printing machine comprising a table, first and second transverse pushers mounted on said table, said first pusher being forward of and laterally offset from said second pusher, a stop member mounted on said table in lateral alignment with the rear edge of said first pusher, means for moving successive upright cans onto said table into engagement with said stop member, an indexing fork movable longitudinally of said table from a position forwardly of said first pusher to a position approximately aligned laterally with the forward edge of said second pusher, said first pusher being engageable with an upright can positioned against said stop member to align it with said indexing fork, a disk rotatably mounted on said table in lateral alignment with said second pusher and in longitudinal alignment with said indexing fork, said indexing fork being engageable with an upright can aligned therewith to move it onto said disk, a printing unit mounted on said table in spaced relationship to said disk, a guide rail mounted on said table, said guide rail extending from the proximity of said disk to the proximity of said printing unit, and a feed unit mounted on said table and movable longitudinally thereof, said second pusher being engageable with an upright can on said disk to move it into longitudinal alignment with said feed unit, said feed unit being engageable with an upright can aligned therewith and adapted to cooperate with said guide rail to move said can into predetermined surface engagement with said printing unit.

References Cited in the file of this patent
UNITED STATES PATENTS

| | | |
|---|---|---|
| 1,767,577 | Buchanan et al. | June 24, 1930 |
| 2,262,799 | Everett | Nov. 18, 1940 |
| 2,577,341 | Magnusson | Dec. 4, 1951 |
| 2,614,681 | Keil | Oct. 21, 1952 |
| 2,635,533 | Stewart | Apr. 21, 1953 |
| 2,767,647 | Hakogi | Oct. 23, 1956 |
| 2,817,438 | Birchall | Dec. 24, 1957 |
| 2,873,842 | Erickson | Feb. 17, 1959 |